(12) United States Patent
Klittich et al.

(10) Patent No.: US 6,261,996 B1
(45) Date of Patent: Jul. 17, 2001

(54) PREGERMINATED RICE SEED

(75) Inventors: Carla Rasmussen Klittich, Raleigh, NC (US); Michael Glenn Redlich, Eunice, LA (US)

(73) Assignee: Rhone-Poulenc Inc., Research Triangle Park, NC (US)

( * ) Notice: Subject to any disclaimer, the term of this patent is extended or adjusted under 35 U.S.C. 154(b) by 0 days.

(21) Appl. No.: 09/420,791

(22) Filed: Oct. 19, 1999

Related U.S. Application Data

(60) Division of application No. 08/916,266, filed on Aug. 22, 1997, which is a continuation-in-part of application No. 08/656,966, filed on Jun. 6, 1996, now abandoned, and a continuation-in-part of application No. 08/873,468, filed on Jun. 12, 1997, now abandoned.

(60) Provisional application No. 60/000,024, filed on Jun. 8, 1995, and provisional application No. 60/019,667, filed on Jun. 12, 1996.

(51) Int. Cl.$^7$ ............... A01N 43/08; A01N 43/56; A01N 43/40; A01C 1/06; C05G 3/02

(52) U.S. Cl. ............ 504/100; 504/297; 504/298; 504/313; 504/320; 514/341; 514/404; 514/406; 514/407; 47/57.6; 47/DIG. 9; 71/64.02; 71/64.07

(58) Field of Search .................... 504/100, 297, 504/298, 313, 320; 514/341, 404, 406, 407; 47/57.6, DIG. 9; 71/64.02, 64.07

(56) References Cited

U.S. PATENT DOCUMENTS

| 4,305,225 | * 12/1981 | Yuan | 47/58 |
|---|---|---|---|
| 5,232,940 | 8/1993 | Hatton et al. | 514/407 |
| 5,236,938 | 8/1993 | Huang et al. | 514/341 |
| 5,716,977 | 2/1998 | Colliot et al. | 514/407 |

FOREIGN PATENT DOCUMENTS

| 19511269 | * 10/1995 | (DE) . |
|---|---|---|
| 0295117 | * 12/1988 | (EP) . |
| 0385809 | * 9/1990 | (EP) . |
| 0403300 | * 12/1990 | (EP) . |
| 0679650 | * 11/1995 | (EP) . |
| 87/03781 | 7/1987 | (WO) . |
| 93/01705 | 2/1993 | (WO) . |
| 93/06089 | 4/1993 | (WO) . |
| 93/04036 | * 5/1994 | (WO) . |
| 94/21107 | 9/1994 | (WO) . |
| 94/21606 | 9/1994 | (WO) . |

OTHER PUBLICATIONS

CAB Abstract, Accession No. 93:15700, 1993.*

Webster et al, *Hilgardia,* 1973, vol. 41, pp. 689–698.

*The Pesticide Manual,* tenth edition (1994), the British Crop Protection Council, London, pp. 538–540.

* cited by examiner

*Primary Examiner*—John Pak
(74) *Attorney, Agent, or Firm*—Burns, Doane, Swecker & Mathis, L.L.P.

(57) ABSTRACT

A pregerminated rice seed comprising a plant growth regulator, optionally further comprising a phytoprotection product, especially an insecticide.

15 Claims, No Drawings

PREGERMINATED RICE SEED

CROSS-REFERENCE TO RELATED APPLICATIONS

This application is a divisional of prior copending U.S. patent application Ser. No. 08/916,266, filed Aug. 22, 1997, incorporated by reference herein in its entirety and relied upon. Application Ser. No. 08/916,266 is a continuation-in-part of application Ser. No. 08/656,966, filed Jun. 6, 1996, now abandoned, which claims the priority of U.S. Provisional Patent Application No. 60/000,024, filed Jun. 8, 1995; application Ser. No. 08/916,266 filed Aug. 22, 1997 is also a continuation-in-part of application Ser. No. 08/873,468, filed Jun. 12, 1997, now abandoned, which claims the priority of U.S. Provisional Patent Application No. 60/019,667 filed Jun. 12, 1996.

The present invention relates to a process for the preparation of rice seed for sowing and to pregerminated rice seed.

Rice crops are attacked by a number of pests. A useful method of protecting rice and rice seed and rice crop is to apply one or more phytoprotection products to the seed by different methods such as coating, soaking or dipping. Although it is well-known that dry or ungerminated seeds can be coated with a phytoprotection product and subsequently sown, a common practice is to pregerminate rice seed by soaking the seed in water containing one or more phytoprotection products followed by a period in which the soaked, treated seed is allowed to drain and produce a radicle. (The period during which the seed is soaked, drained and during which a radicle is produced is called the pregermination period and the resulting composition, that is, a seed from which a radicle has been produced before it is sown, is a pregerminated seed.)

This is a most efficient and attractive way of seed treatment, but there remains the problem of the disposal of hazardous waste water despite efforts to minimize the concentration of the phytoprotection product or the volume of the liquid. Another potential hazard of this conventional seed soaking method is the generation of seeds that are treated but unused for any reason. Said unused seeds can be hazardous waste.

Rice seeds are commonly sown by dropping pregerminated seeds from an airplane over a flooded rice propagation area. Webster et al, in the publication *Hilgardia,* 1973, vol. 41, pages 689–698, indicate that sowing pregerminated rice seed in such a manner "introduces complications not experienced with seed treatment in other cereals." Further, the authors point out that the standard practice of soaking rice seed for 24 hours and then draining for 24 hours complicates development of suitable methods of applying phytoprotection products since "the protectant chemical must adhere to the seed in effective concentrations throughout the soaking and planting process to be effective during the initial period of seed germination and seedling establishment." In an effort to arrive at a suitable method, Webster et al investigated the effects of several protectant chemicals, Difolatan, Captan and Thiram, applied before, after and during the soaking procedure and measured effectiveness in terms of percent stand increase over untreated control. They conclude that application prior to soaking afforded best total stand establishment. Application of phytochemical after soaking was found to give no increase in plant stand, that is, no significant protectant effect. No details as to the temperature or length of soaking time or production of a radicle or size thereof were given. Moreover, the authors' recommendations to treat rice seed with phytoprotection products either before or during soaking, if used with the preferred volumes of seeds according to the instant invention, would generate very large volumes of hazardous liquid waste.

International Patent Publication No. WO 93/01705 describes a process in which seed is coated by a foam and one or more phytoprotection products. According to the method described in this document, there is simultaneously applied to plant seeds: (1) a liquid composition containing at least one phytoprotection product; and (2) a foam formed from a second composition containing at least one non-phytotoxic foaming agent. The two compositions are brought separately into contact with the seeds while mixing to ensure a homogeneous and even coating. WO 93/01705 states that "seeds thus treated may optionally be pregerminated." The quoted expression is believed to clearly suggest optional pregermination of the seeds after the phytoprotection process and prior to planting (a step sequence which Webster et al found most desirable). Further, the aforementioned problem of unused, treated seed is not obviated by the WO 93/01705 invention.

An object of the instant invention is to provide a highly effective method of preparing rice seeds for sowing.

Another object of the instant invention is to provide a highly effective method of preparing rice seeds for sowing, for example by plane.

Another object of the instant invention is to provide a process for the preparation of rice seed for sowing in large quantities that reduces or minimizes or even avoids altogether the generation of hazardous, unusable seed.

Another object of the instant invention is to provide a process for the preparation of rice seed for sowing that reduces or minimizes or even avoids the problem of liquid waste.

Another object of the instant invention is to minimize the exposure of humans to phytoprotection products.

Another object of the instant invention is to provide a rapid method for the treatment of pregerminated rice seed by a phytoprotection product.

Another object of the instant invention is to provide a method of protection of pregerminated rice seed against fungal pathogens.

Another object of the instant invention is to provide a method of protection of rice seed against insecticidal pests which is effective over a substantial period of time.

Another object of the instant invention is to provide a method of protection of rice seed which avoids the disadvantages of the known methods.

It has now been found that the above objects can be met in whole or in part by the means of the instant invention. These and other objects will better appear during the description of the invention.

There is now provided a method of preparing rice seed for sowing comprising the following steps:

(a) pregerminating said rice seed in water containing substantially no phytoprotection product at a temperature and during a period of time sufficient to produce a radicle having a size such that the said radicle is not substantially damaged in a subsequent seed treatment process; and (b) mixing the pregerminated seed thus obtained with an effective amount of a phytoprotection product.

A preferred embodiment of the invention is one in which the amount of said pregerminated seed is appropriate for sowing from the air, usually sowed in quantities between about 10 and about 20000 kg, more preferably between about 100 and about 1500 kg. The treatment of such large quantities in such a short period of time and with minimum damage to the grains is an especially difficult problem. Said pregermination process is preferably contained in one or more bags. Bags are water permeable containers that are optionally deformable, preferably able to contain between about 10 and about 1000 kg of seed before soaking. Sowing from the air generally entails the loading of an aircraft, preferably an airplane, followed by flying over the field to be sown and distributing the seed to be sown. Another type of aircraft suitable for sowing is a helicopter.

Another preferred embodiment of the invention is that the size of the radicle is between about 0.1 and about 15 mm, more preferably between about 1 and about 5 mm.

The mixing of said seed with the phytoprotection product generally takes place at or near (e.g., within about 50 kilometers of) an airport or airstrip, preferably within the legal boundaries of an airport used by said planes for sowing. Said mixing can optionally take place in a mixing apparatus that is in or on a truck, trailer, or other movable device suitable for transporting said mixing apparatus. In another aspect of the invention, said seed to be pregerminated and mixed with a phytoprotection product is transported by crane or forklift or hopper mechanism at each stage. Another mode of transportation contemplated in the invention of said seed at each or any stage of the method is by use of an auger.

By the term "phytoprotection product" is meant a material which provides an effective protection of rice seeds from pests' attacks. The invention is mainly directed to the protection of seeds and plants derived from such seeds from insect attacks, particularly rice water weevil, as well as from fungal attacks, in which cases the phytoprotection product comprises an insecticidally active compound or fungicidally active compound, respectively. The phytoprotection products which are used according to the present invention may also comprises such materials as biocontrol agents, that is, biological substances (typically, substances comprising fungi, bacteria or viruses) that protect seeds and plants derived from such seeds from insect and fungal attacks and/or provide nutrients to said seeds or plants derived from said seeds. Another type of phytoprotection product contemplated by the invention comprises the class of macronutrients and micronutrients, that is, substances that function as a plant food. The phytoprotection product may comprise more than one active ingredient, especially at least one insecticide together with at least one fungicide. Also, one or more biocontrol agents may be used together with one or more insecticides or one or more fungicides or both. One or more macronutrients or micronutrients may also be used together with each other and/or with one or more fungicides and/or insecticides and/or biocontrol agents.

The phytoprotection product which is used to coat the rice seed is preferably a liquid composition, which may be aqueous or non-aqueous, in order to improve the speed of application. It may be fairly diverse in nature and is defined in practice so as to be able to ensure the coating upon the seed of the required effective amount of active material. It is preferably other than a gel. The preferred formulations used in the invention can vary, for example, a solution, suspension, emulsion, or the like with a viscosity less than about 500 centipoises. The formulation used in the invention thus comprises, as necessary constituents, the active material and solvent, usually water; it optionally and additionally contains other customary constituents used in agrochemical formulations, for example those described in International Patent Publications No. WO 87/03781, 93/06089 and 94/21606, as well as in European Patent Publication No. 0295117 and U.S. Pat. No. 5,232,940, all of which are incorporated by reference herein and relied upon in their entireties, including their description of agrochemical compositions and methods for formulating same. However, among the compositions described in this known art, it is preferable to choose those which are more suited to rice seed coating. For example, sticking agents such as low molecular weight polymer often effectively promote sticking of the insecticidally active material upon the seed. The aqueous formulations used in the invention may also comprise another non-aqueous liquid phase.

The term "effective amount" as used herein means an amount of the phytoprotection product sufficient to produce the desired response; for example, in the case of an insecticidal product, it is an insecticidally effective amount; in the case of a fungicidal product, it is a fungicidally effective amount, etc.

According to a particularly preferred feature of the invention, the time from the end of pregermination period to the mixing of the pregerminated seed with the phytoprotection product is less than about twenty-four hours, preferably less than about eight hours. In another aspect of the invention, the time from the end of the pregermination period to the sowing of the seed is less than about forty-eight hours, preferably less than about twenty-four hours and even more preferably less than about eight hours.

In another aspect of the invention, the pregermination of rice seed is preferably provoked or activated during a period of time comprised during about half a day to several days, preferably during a period comprised between one day and three days.

The following representative insecticidally active materials may be used in accord with the present invention:

(E)-$N^1$-[(6-chloro-3-pyridyl)methyl]-$N^2$-cyano-$N^1$-methylacetamidine (acetamiprid);

1-(6-chloro-3-pyridylmethyl)-N-nitroimidazolidin-2-ylideneamine (imidacloprid);

N-[(6-chloro-3-pyridinyl)methyl]-N-ethyl-N'-methyl-2-nitro-1,1-ethenediamine (nitenpyram);

[3-[(6-chloro-3-pyridinyl)methyl]-2-thiazolidinylidene]-cyanamide (thiacloprid);

3-[(2-chloro-5-thiazolyl)methyl]tetrahydro-5-methyl-N-nitro-4H-1,3,5-oxadiazin-4-imine (CGA-293343);

1-[(2-chloro-5-thiazolyl)methyl]tetrahydro-3,5-dimethyl-N-nitro-1,3,5-triazin-2(1H)-imine (AKD-1022);

N-methyl-N'-nitro-N'-[(tetrahydro-3-furanyl)methyl]-guanidine (MTI-446);

N-[(2-chloro-5-thiazolyl)methyl]-N'-methyl-N"-nitro-guanidine (TI-435);

2,3-dihydro-2,2-dimethylbenzofuran-7-yl methylcarbamate (carbofuran);

O,O-diethyl O-3,5,6-trichloro-2-pyridiyl phosphorothioate (chlorpyrifos);

1-(4-chlorophenyl)-3-(2,6-difluorobenzoyl)urea (diflubenzuron);

a pyrethroid such as (S)-α-cyano-3-phenoxybenzyl (S)-2-(4-chlorophenyl)-3-methylbutyrate (esfenvalerate);

[1α(S*),3α(Z)]-(±)-cyano(3-phenoxyphenyl)methyl 3-(2-chloro-3,3,3-trifluoro-1-propenyl)-2,2-dimethylcyclopropanecarboxylate (lambda-cyhalothrin);

an insecticidal 1-aryl pyrazole;

an insecticidal 1-aryl pyrrole; or an insecticidal 1-aryl imidazole.

The 1-arylpyrazoles which can be used according to the instant invention are preferably compounds of formula (I):

$$\text{(I)}$$

wherein:
- $R_1$ is CN or methyl;
- $R_2$ is $S(O)_nR_3$;
- $R_3$ is alkyl or haloalkyl;
- $R_4$ represents a hydrogen or halogen atom or a member selected from the group consisting of $-NR_5R_6$, $-S(O)_mR_7$, $-C(O)R_7$, $-C(O)OR_7$, alkyl, haloalkyl, $-OR_8$ and $-N=C(R_9)(R_{10})$;
- $R_5$ and $R_6$ independently represent a hydrogen atom or an alkyl, haloalkyl, $-C(O)$alkyl, alkoxycarbonyl or $-S(O)_rCF_3$ radical; or $R_5$ and $R_6$ together form a divalent alkylene radical which can be interrupted by one or two divalent heteroatoms, such as oxygen or sulfur;
- $R_7$ represents an alkyl or haloalkyl radical;
- $R_8$ represents an alkyl or haloalkyl radical or a hydrogen atom;
- $R_9$ represents an alkyl radical or a hydrogen atom;
- $R_{10}$ represents a phenyl or heteroaryl group which is unsubstituted or substituted by one or more halogen atoms or a member selected from the group consisting of OH, $-O$-alkyl, $-S$-alkyl, cyano and alkyl;
- X represents a trivalent nitrogen atom or a $C-R_{12}$ radical, the other three valences of the carbon atom forming part of the aromatic ring;
- $R_{11}$ and $R_{12}$ represent, independently of each other, a hydrogen or halogen atom;
- $R_{13}$ represents a halogen atom or a haloalkyl, haloalkoxy, $-S(O)_qCF_3$ or $-SF_5$ group;
- m, n, q and r represent, independently of one another, an integer equal to 0, 1 or 2;

provided that, when $R_1$ is methyl, then $R_3$ is haloalkyl, $R_4$ is $NH_2$, $R_{11}$ is Cl, $R_{13}$ is $CF_3$, and X is N.

The alkyl and alkoxy radicals and alkyl and alkoxy portions of other radicals have one to six carbon atoms, preferably 1 to 4 carbon atoms, and can be branched or linear.

When $R_5$ and $R_6$ together form alkylene optionally interrupted by one or two hetero atoms, $-NR_5R_6$ preferably represents a 3- to 8-membered ring.

When $R_{10}$ is heteroaryl, it is preferably pyridyl, most preferably 2-pyridyl.

A preferred group of effective 1-arylpyrazoles of formula (I) for use in the present invention is that wherein:
- $R_1$ is CN;
- $R_3$ is a haloalkyl radical;
- $R_4$ is $NH_2$;
- X is $C-R_{12}$;
- $R_{11}$ and $R_{12}$ represent, independently of one another, a halogen atom; and
- $R_{13}$ is a haloalkyl radical.

A most preferred compound of formula (I) for use herein is 5-amino-1-(2,6-dichloro-4-trifluoromethylphenyl)-4-trifluoromethylsulfinyl-3-cyanopyrazole, also known as 5-amino-i-(2-6-dichloro-α,α,α-trifluoro-p-tolyl)-4-trifluoromethyl-sulfinylpyrazole-3-carbonitrile or fipronil and hereafter designated as Compound A.

Compounds of formula (I) may be prepared according to known processes, for example as described in International Patent Publications No. WO 87/03781, 93/06089, and 94/21606 as well as in European Patent Publications No. 0295117, 0403300, 0385809 and 0679650, German Patent Publication No. 19511269 and U.S. Pat. Nos. 5,232,940 and 5,236,938 (all of which are incorporated by reference herein and relied upon in their entireties, especially for their description of compounds of formula (I) and methods for their preparation and use, both general and specific), or other process according to the knowledge of a man skilled in the art of chemical synthesis.

Representative fungicides that may be used in the method of the invention include the following:

[[1,2-ethanediylbis[carbamodithioato]](2-)]manganese mixture with [[1,2-ethanediylbis[carbamodithioato]](2-)]zinc (mancozeb);

methyl 1-(butylcarbamoyl)benzimidazol-2-ylcarbamate (benomyl);

3-(3,5-dichlorophenyl)-N-(1-isopropyl)-2,4-dioxoimidazolidine-1-carboxamide (iprodione);

ethyl hydrogen phosphonate (fosetyl);

ethyl hydrogen phosphonate aluminum salt (fosetyl-aluminum);

tetramethylthiuram disulfide (thiram);

(±)-1-[2-(2,4-dichlorophenyl)-4-propyl-1,3-dioxolan-2-yl]methyl-1H-1,2,4-triazole (propiconazole);

(±)-E-5-(4-chlorobenzylidene)-2,2-dimethyl-1-(1H-1,2,4-triazol-1-ylmethyl)cyclopentanol (triticonazole);

5,6-dihydro-2-methyl-1,4-oxathiin-3-carboxanilide (carboxin);

methyl N-(2-methoxyacetyl)-N-(2,6-xylyl)-DL-alaninate (metalaxyl);

methyl (E)-2-{2-[6-(2-cyanophenoxy)pyrimidin-4-yloxy]phenyl}-3-methoxyacrylate (azoxystrobin); or a copper fungicide, such as but not limited to dicopper chloride trihydroxide.

Representative biocontrol agents that may be used in the method of the invention include:

*Bacillus thuringiensis;*
*Bacillus subtilis;*
Pseudomonas spp.;
Rhizobium spp.;
Azospirillum spp.; or
Beauveria spp.

Micronutrients and macronutrients that may be used according to the invention include:
iron chelates;
zinc chelates;
manganese chelates; or
nitrogen.

As noted above, in another aspect of the invention, phytoprotection products may be mixed with the above seed separately, together or in any combination as specified in standard reference material for those skilled in the art of the application of phytoprotection products.

The amount of phytoprotection product, preferably an insecticidally active material, may depend very much on the particular product being used. Generally the amount of active ingredient which is applied to the pregerminated seed is between about 2 and about 1000 g/q (gram of active ingredient per quintal of germinated seed), preferably (especially for the 1-aryl pyrazoles or imidacloprid) between about 5 and about 800 g/q, still more preferably between about 5 and about 100 g/q.

In yet another aspect, the present invention relates to a new process for cultivating rice and new improved rice seed.

It is known to improve rice seed by treating such seed by means of plant growth regulators such as gibberellic acid so as to get stronger and better plants, better and stronger germination and thus obtain better growing and cropping conditions. Furthermore, planted rice seed or the rice crops therefrom are also attacked by a number of pests or can suffer predation by birds. Another problem associated with rice cropping is the displacement of said rice plants upon flooding rice fields, a common agricultural practice. Current methods for protecting rice and rice seed are already discussed hereinabove.

In accord with this further aspect of the present invention, one object is to still further improve the rice seed, rice germination, rice plant, rice plant growing and rice plant cropping.

Another object of this further aspect of the instant invention is to provide an improved method of rice cultivation.

Another object of this further aspect of the instant invention is to provide a method of having stronger rice seedlings or plants which have a better resistance to wind and rain.

Another object of this further aspect of the instant invention is to provide an improved process for the preparation of rice seed for sowing.

Another object of this further aspect of the instant invention is to provide a new seed which is designed for sowing by plane.

Another object of this further aspect of the instant invention is to provide a highly effective method of preparing rice seeds for sowing by plane.

Another object of this further aspect of the instant invention is to provide a process for the preparation of rice seed for sowing in large quantities that reduces or minimizes or even avoids altogether the generation of hazardous, unusable seed.

Another object of this further aspect of the instant invention is to provide a process for the preparation of rice seed for sowing that reduces or minimizes or even avoids the problem of liquid waste.

Another object of this further aspect of the instant invention is to minimize the exposure of humans to phytoprotection products.

Another object of this further aspect of the instant invention is to provide a rapid method for the treatment of rice seed by a phytoprotection product.

Another object of this further aspect of the instant invention is to provide a method of protection of rice seed against insect pests which is effective over a substantial period of time.

Another object of this further aspect of the instant invention is to provide a method of protection of rice seed which avoids the disadvantages of the known methods.

These and other objects will better appear during the description of this further aspect of the invention. It has now been found that these objects can be met in whole or in part by means of this further aspect of the instant invention.

A first embodiment of this further aspect of the instant invention is a new seed which is a pregerminated rice seed comprising (preferably as a coating) a plant growth regulator, preferably a gibberellin, more preferably gibberellic acid.

Another embodiment of this further aspect of the invention is related to pregerminated rice seed comprising a plant growth regulator (preferably a gibberellin, more preferably gibberellic acid), said seed having a radicle size such that said radicle is not substantially damaged by the seed treatment process. Practically speaking, said seed generally has a radicle size from about 0.1 to about 15 mm, preferably from about 0.5 to about 10 mm, even more preferably from about 1 to about 5 mm.

There is also provided by this further aspect of the present invention a method of preparation of rice seed for sowing comprising the following steps:

(a) pregerminating said rice seed in water containing substantially no phytoprotection product or plant growth regulator at a temperature and during a period of time sufficient to produce a radicle having a size such that said radicle is not substantially damaged in a subsequent seed treatment process; and (b) mixing the pregerminated seed thus obtained with an effective amount of plant growth regulator (preferably a gibberellin, more preferably gibberellic acid).

A preferred embodiment of this further aspect of the invention is one in which the amount of said pregerminated seed is appropriate for sowing from the air, usually sowed in quantities between about 10 and about 20000 kg, more preferably between about 100 and about 1500 kg. The treatment of such large quantities in such a short period of time and with minimum damage to the grains is an especially difficult problem.

Said pregermination process is preferably contained in one or more bags. Bags are water permeable containers that are optionally deformable, preferably able to contain between about 10 and about 1000 kg of seed before soaking. Sowing from the air generally entails the loading of an aircraft, preferably an airplane, followed by flying over the field to be sown and distributing the seed to be sown. Another type of aircraft suitable for sowing is a helicopter.

The plant growth regulator which can be used in this further aspect of the instant invention is preferably used as a composition comprising an effective amount of plant growth regulator, preferably a gibberellin, more preferably gibberellic acid, which optionally further comprises one or more phytoprotection products.

The plant growth regulator can be used in this further aspect of the present invention together with a phytoprotection product as defined hereinafter.

The seed as hereinabove described is usually brought into contact with the plant growth regulator by mixing. The mixing of said seed with a plant growth regulator generally takes place at or near (e.g., within about 50 kilometers of) an airport or airstrip, preferably within the legal boundaries of an airport used by said planes for sowing. Said mixing can optionally take place in a mixing apparatus that is in or on a truck, trailer, or other movable device suitable for transporting said mixing apparatus. In another embodiment of this further aspect of the invention, said seed to be pregerminated and mixed with a plant growth regulator is transported by crane or forklift or hopper mechanism at each stage. Another contemplated mode of transportation of the seed at each or any stage of the method of this further aspect of the invention is by use of an auger.

The plant growth regulator which is used to coat the rice seed is preferably a liquid composition, which may be aqueous or non-aqueous, in order to improve the speed of application. It may be fairly diverse in nature and is defined in practice so as to be able to ensure the coating upon the seed of the required effective amount of active material. It is preferably other than a gel. The formulation used in this further aspect of the invention can be, for example, a solution, suspension, emulsion, suspoemulsion (that is to say, an emulsion which is simultaneously a suspension), powder dissolved or suspended in liquid, or the like. The viscosity of this liquid composition is preferably less than about 500 centipoises. The formulation used in this further aspect of the invention thus comprises, as necessary constituents, the active material(s) and solvent(s), usually water; it optionally and additionally contains other customary constituents used in agrochemical formulations, for example those described in International Patent Publications No. WO 87/03781, 93/06089 and 94/21606 as well as in European Patent Publication No. 0295117 and U.S. Pat. No. 5,232,940, all of which are incorporated by reference herein and relied upon in their entireties for their description of agrochemical compositions and methods for formulating same.

Among the compositions which can be used in this further aspect of the invention, it is preferable to choose those which are more suited to rice seed coating. For example, sticking agents such as low molecular weight polymer, e.g. latex polymer formulations, often effectively promote sticking of the plant growth regulating material or phytoprotection product upon the seed. The aqueous formulations used in this further aspect of the invention may also comprise another non-aqueous liquid phase.

The term "phytoprotection product" used in connection with this further aspect of the invention has the same meaning as used hereinabove. The phytoprotection products which are particularly preferred for use with this further aspect of the invention are likewise those already described hereinabove, especially insecticides and fungicides, and also biocontrol agents and macronutrients and micronutrients as previously defined herein.

By the term "plant growth regulator" is meant any substance or product or composition or compound that promotes plant or root growth, or both, as understood by those skilled in the art of plant growth regulating effects. The known effects of gibberellic acid are typical of plant growth regulating effects as meant in the present specification.

The term "effective amount" as used herein means an amount of the plant growth regulator or phytoprotection product sufficient to produce the desired response; for example, in the case of the plant growth regulator, an effective plant growth regulating amount; in the case of an insecticide, an insecticidally effective amount; in the case of a fungicide, a fungicidally effective amount, etc.

According to a particularly preferred feature of this further aspect of the invention, the time from the end of the pregermination period to the mixing of the pregerminated seed with the plant growth regulator is less than about twenty-four hours, preferably less than about eight hours. In another feature of this further aspect of the invention, the time from the end of the pregermination period to the sowing of the seed is less than about forty-eight hours, preferably less than about twenty-four hours, even more preferably less than about eight hours.

In another aspect of this further aspect of the invention, the pregermination of rice seed is preferably provoked or activated during a period of time from about half a day to five days, preferably during a period comprised from one day to three days.

According to another and important feature of this further aspect of the invention, the seed is treated with a plant growth regulator comprising gibberellic acid and an insecticidally active ingredient, wherein the ratio of the insecticidally active ingredient to gibberellic acid depends upon the specific insecticidally active ingredient which is used. This ratio (insecticidally active ingredient/gibberellin; w/w) is generally comprised in a range from about 10/1 to about 1000/1, preferably from about 20/1 to about 200/1.

In a particularly preferred embodiment of this further aspect of the invention, the insecticidally active ingredient is selected from the group comprising all of the representative insecticidally active materials named hereinabove.

The insecticidal 1-arylpyrazoles which can be used according to this further aspect of the instant invention are preferably compounds of formula (I):

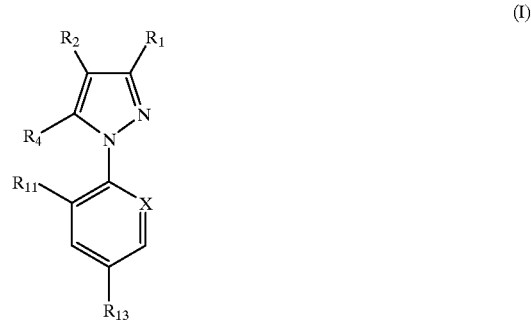

in which:
$R_1$ is CN or methyl;
$R_2$ is $S(O)_n R_3$;
$R_3$ is alkyl or haloalkyl;
$R_4$ represents a hydrogen or halogen atom or a member selected from the group consisting of $NR_5R_6$, $S(O)_m R_7$, $C(O)R_7$, $C(O)O—R_7$, alkyl, haloalkyl, $OR_8$ and $—N=C(R_9)(R_{10})$;
$R_5$ and $R_6$ independently represent a hydrogen atom or an alkyl, haloalkyl, C(O)alkyl, alkoxycarbonyl or $S(O)_r CF_3$ radical; or $R_5$ and $R_6$ together form a divalent alkylene radical which is optionally interrupted by one or two heteroatoms, such as oxygen, nitrogen or sulfur;
$R_7$ represents an alkyl or haloalkyl radical;
$R_8$ represents an alkyl or haloalkyl radical or a hydrogen atom;
$R_9$ represents an alkyl radical or a hydrogen atom;
$R_{10}$ represents a phenyl or heteroaryl group which is unsubstituted or substituted by one or more halogen, OH, —O-alkyl, —S-alkyl, cyano, or alkyl;
X represents a trivalent nitrogen atom or a $C—R_{12}$ radical, the other three valences of the carbon atom forming part of the aromatic ring;
$R_{11}$ and $R_{12}$ represent, independently of each other, a hydrogen or halogen atom;
$R_{13}$ represents a halogen atom or a haloalkyl, haloalkoxy, $S(O)_q CF_3$ or $SF_5$ group; and
m, n, q, and r represent, independently of one another, an integer equal to 0, 1, or 2;
provided that, when $R_1$ is methyl, then $R_3$ is haloalkyl, $R_4$ is $NH_2$, $R_{11}$ is Cl, $R_{13}$ is $CF_3$ and X is N.

The alkyl and alkoxy radicals and alkyl and alkoxy portions of other radicals have one to six carbon atoms and can be branched or linear. The haloalkyl and haloalkoxy groups preferably have one to four carbon atoms. The haloalkyl and haloalkoxy groups can bear one or more halogen atoms; preferred groups of this type include —$CF_3$ and —$OCF_3$.

When $R_5$ and $R_6$ together form alkylene optionally interrupted by one or two hetero atoms, —$NR_5R_6$ preferably represents a 3 to 8-membered ring, most preferably a 5, 6 or 7-membered ring.

When $R_{10}$ is heteroaryl, it is preferably pyridyl, most preferably 2-pyridyl.

It will be understood that the 1-arylpyrazoles of formula (I) include enantiomers and/or diastereomers thereof.

A preferred group of 1-arylpyrazoles for use in this further aspect of the present invention comprises compounds of formula (I) with one or more of the following features:

$R_1$ is CN;

$R_4$ is —$NR_5R_6$;

$R_5$ and $R_6$ are independently selected from hydrogen, alkyl, haloalkyl, C(O)alkyl or alkoxycarbonyl;

X is C—$R_{12}$;

$R_{13}$ is halogen, haloalkyl, haloalkoxy or —$SF_5$.

Another preferred group of effective 1-arylpyrazoles of formula (I) for use in this further aspect of the present invention is that wherein:

$R_1$ is CN;

$R_3$ is a haloalkyl radical;

$R_4$ is $NH_2$;

X is C—$R_{12}$;

$R_{11}$ and $R_{12}$ represent, independently of each other, a halogen atom; and $R_{13}$ is a haloalkyl radical.

A most preferred compound of formula (I) for use herein in this further aspect of the invention is 5-amino-1-(2,6-dichloro-4-trifluoromethylphenyl)-4-trifluoromethylsulfinyl-3-cyanopyrazole, also known as fipronil and hereafter designated as Compound A.

Compounds of formula (I) may be prepared according to known processes, for example as described in International Patent Publications No. WO 87/03781, 93/06089, and 94/21606 as well as in European Patent Publications No. 0295117, 0403300, 0385809 and 0679650, German Patent Publication No. 19511269 and U.S. Pat. Nos. 5,232,940 and 5,236,938 (all of which are already incorporated by reference hereinabove and relied upon in their entireties, especially for their description of compounds of formula (I) and methods for their preparation and use, both general and specific), or other process according to the knowledge of a man skilled in the art of chemical synthesis.

Representative fungicides that may be used in the method of this further aspect of the invention include all of the representative fungicides named hereinabove.

Similarly, representative biocontrol agents, micronutrients and macronutrients that may be used in the method of this further aspect of the invention include all those named earlier in this description.

The gibberellins are a known group of plant growth regulators which has been described in inter alia, *The Pesticide Manual,* 10th edition, (1994), The British Crop Protection Council, London. Gibberellic acid is a member of this group.

In another embodiment of this further aspect of the invention, phytoprotection products may be mixed with the seed separately, together or in any combination as specified in standard reference material for those skilled in the art of the application of phytoprotection products, in addition of course to the plant growth regulator.

The amount of pesticidally active, preferably insecticidally active, material may depend very much of the particular pesticide or insecticide being used in this further aspect of the present invention. Generally, the amount of active ingredient which is applied to the pregerminated seed is comprised between about 2 and about 1000 g/q. (gram of active ingredient per quintal of germinated seed), preferably (especially for the 1-aryl pyrazoles or imidacloprid) between about 5 and about 800 g/q., still more preferably between about 5 and about 100 g/q.

According to a further embodiment of this further aspect of the invention, there is now provided a new composition of matter which is a dry pregerminated seed rice comprising on its surface a plant growth regulating agent, preferably a gibberellin, and more preferably gibberellic acid, and optionally a pesticidally active ingredient such an insecticidally active ingredient. The dry seed may be dry only at the outside part of the seed; some humidity may be present in the inner part of the seed. This dry germinated seed has a radicle whose size is generally between about 0.1 mm up to about 15 mm, preferably between about 0.5 and about 10 mm.

The amount of plant growth regulating agent, preferably of gibberellic acid, laid upon the seed in this further aspect of the invention is generally comprised between about 0.01 and about 50 g/q. (gram of active ingredient per quintal of pregerminated seed), preferably (especially for gibberellic acid) between about 0.1 and about 5 g/q., still more preferably between about 0.3 and about 3 g/q.

The amount of pesticidally active ingredient, preferably of insecticidally active ingredient, laid upon the seed in this further aspect of the invention is generally comprised between about 2 and about 1000 g/q. (gram of active ingredient per quintal of germinated seed), preferably (especially for the 1-aryl pyrazoles or imidacloprid) between about 5 and about 800 g/q., still more preferably between about 5 and about 100 g/q.

In the various methods or processes for treating rice seeds as defined above in accord with this further aspect of the invention, the amount of formulation brought directly into contact with the seed (or propagation material) to be treated is generally between about 0.1% and about 20%, preferably between about 0.5% and about 1.5%, of the weight of seeds to be treated. Values outside these ranges, whether more or less, can also be used but without substantial or specific advantage.

This further aspect of the invention also relates to a process for cultivating and/or growing rice in which the germinated rice seed, as hereinabove defined, coated or otherwise combined with a composition comprising an effective dose of plant growth regulating agent, and optionally of pesticidally active ingredient, is sown. The process is such that, for a long subsequent period after germination, preferably for the rest of the growing season, it does not comprise any other treatment (either of the seed or of the plant resulting therefrom) to protect the plants against the same insects (that is to say, no other insecticidal treatment). This means that the effectiveness of the process according to the instant invention is often sufficient to eliminate the need for another insecticide treatment altogether.

This further aspect of the invention also relates to a mass, or collection, of germinated (or, in other words, pregerminated) rice seeds, in which the seeds are in the form of grains which have already germinated (in other words, these seeds have already their first radicle), and are at the same time covered or coated (e.g. bathed in or sprayed on) with a formulation as defined above and containing a plant growth regulating agent, and optionally a phytoprotection product (preferably an insecticide) as herein described, especially those of formula (I).

The improved seeds of this further aspect of the invention, when germinated and grown, have a bigger shoot and a bigger root than untreated seeds. Known rice seeds treated by gibberellic acid usually had a bigger shoot, but not a bigger root than the untreated seed. According to a feature of this further aspect of the invention, the seeds are such that the radicle and the shoot are generally the same length. Furthermore, the improved seeds of this further aspect of the invention are more resistant to being uprooted or displaced by wind after sowing, especially 2 or 3 days or more after sowing. This advantage exists even if the seed is not in a deep location in the soil. Another advantage to this method is that said seeds are less likely to be eaten by birds since a sown rice field can be quickly flooded to prevent such eating. Another advantage of this aspect of the instant invention is that, since the rice plants resulting from the said seed treatment are more quickly and firmly established, herbicides can be applied earlier before any weeds become large, thus contributing to the efficacy of the herbicides.

In another important embodiment of this further aspect of the invention, there is now provided a composition comprising a plant growth regulator and a phytoprotection product which is an insecticidal 1-arylpyrazole, an insecticidal 1-arylpyrrole or an insecticidal 1-arylimidazole, preferably an insecticidal 1-arylpyrazole of formula (I):

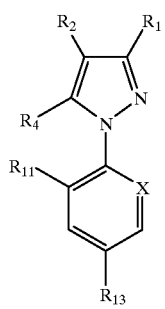

(I)

wherein:
$R_1$ is CN or methyl;
$R_2$ is $S(O)_n R_3$;
$R_3$ is alkyl or haloalkyl;
$R_4$ is hydrogen, halogen, —$NR_5R_6$, —$C(O)OR_7$, —$S(O)_m R_7$, alkyl, haloalkyl, —$OR_8$, —N=$C(R_9)(R_{10})$ or $C(O)R_7$;
$R_5$ and $R_6$ independently represent hydrogen, alkyl, haloalkyl, —C(O)alkyl, alkoxycarbonyl or —$S(O)_r CF_3$; or $R_5$ and $R_6$ form together a divalent alkylene radical which is optionally interrupted by one or more heteroatoms, preferably selected from the group consisting of oxygen, nitrogen and sulfur;
$R_7$ is alkyl or haloalkyl;
$R_8$ is alkyl, haloalkyl or hydrogen;
$R_9$ is hydrogen or alkyl;
$R_{10}$ is a phenyl or heteroaryl group, each of which is unsubstituted or substituted by one or more hydroxy, halogen, —O-alkyl, —S-alkyl, cyano, or alkyl or combinations thereof;
X is nitrogen or —C—$R_{12}$;

$R_{11}$ and $R_{12}$ are independently halogen or hydrogen;
$R_{13}$ is halogen, haloalkyl, haloalkoxy, —$S(O)_q CF_3$ or —$SF_5$; and
m, n, q and r are independently selected from 0, 1, and 2;
provided that when $R_1$ is methyl, then $R_3$ is haloalkyl, $R_4$ is $NH_2$, $R_{11}$ is Cl, $R_{13}$ is $CF_3$, and X is N.

Even more preferably in the composition described immediately above, the plant growth regulator is a gibberellin, preferably gibberellic acid, and the insecticidal 1-arylpyrazole is 5-amino-i-(2,6-dichloro-4-trifluoromethylphenyl)-4-trifluoromethylsulfmyl-3-cyanopyrazole.

The following examples are descriptive, and are not to be taken as limiting examples. Other choices of materials, methods, and organisms will be obvious to those skilled in the art in light of the teaching herein.

EXAMPLE 1

Rice seeds (227 kg) were soaked at 25° C. in water for 24 hours. The seeds were removed from water and allowed to drain for 30 hours. The seeds were drained completely, allowed to absorb excess water, and were allowed to germinate up to the point of having emerging radicles whose size was between 1 and 8 mm.

These seeds were treated by thorough machine mixing with a latex polymer formulation containing about 3% of fipronil. The thus-obtained pregerminated seeds appeared undamaged and had a normal coating of fipronil.

Seed was tested for germination in an incubator and also flown onto a flooded field under standard agricultural practices. The treated seeds behaved the same as untreated seeds, i.e., stand establishment was the same as untreated seed.

EXAMPLE 2

One thousand pounds of rice seeds (450 kg) were pregerminated in one bag by soaking the bag in water for twenty-four hours followed by draining for twenty-four hours. The seeds were treated immediately with mancozeb in a slurry at a rate of 19–22 fluid ounces (570–630 nmL) per hundred pounds (45 kg) of seed. The seed was flown onto flooded fields where it established an acceptable stand of rice plants.

EXAMPLE 3

Rice seeds (227 kg) were soaked at 25° C. in water for 24 hours. The seed was removed from water and allowed to drain for 30 hours. The seeds were allowed to absorb excess water, and were allowed to germinate up to the point of having emerging radicles whose size was between 1 and 8 mm.

These seeds were treated by thorough machine mixing with a latex polymer formulation containing about 0.2% w/v of gibberellic acid. The thus-obtained germinated seeds appeared undamaged and had a coating comprising gibberellic acid.

Seed was sown by plane in a flooded field. After a period of time of 3 to 10 days, it was observed that the shoots had about the same size as the shoots obtained with classical treatment of rice seed with gibberellic acid; however, the root and the shoot were of approximately the same size, contrary to the size obtained with classical treatment of rice seed with gibberellic acid (in which the root is smaller); the seedlings were highly resistant to wind even though they were located in the soil at a depth as small as 0 to 2 mm (less deep than that formed with classical treatment of rice seed with gibberellic acid).

EXAMPLE 4

The procedure of Example 3 was repeated except that the pregerminated seeds were coated with the same treatment of gibberellic acid as in Example 3 and with mancozeb in a slurry at a rate of 19–22 fluid ounces (570–630 mL) per hundred pounds (45 kg) of seed.

Seeds were then sown by plane onto a flooded field where the same observations were made as in Example 3.

EXAMPLE 5

The procedure of Example 3 is repeated, except that the latex polymer formulation containing about 0.2% w/v gibberellic acid further contains about 3% w/v of Compound A. Seeds are then sown by plane onto a flooded field.

While the invention has been described in terms of various preferred embodiments, the skilled artisan will appreciate that various modifications, substitutions, omissions and changes may be made without departing from the spirit thereof. Accordingly, it is intended that the scope of the present invention be limited solely by the scope of the following claims, including equivalents thereof.

What is claimed is:

1. An unsown pregerminated rice seed coated with an effective plant growth regulating amount of gibberellic acid, said seed having a radicle size of from about 0.1 to about 15 mm.

2. An unsown pregerminated rice seed according to claim 1, wherein the radicle and the shoot are approximately the same length.

3. An unsown pregerminated rice seed according to claim 1, wherein the radicle size is in the range of from about 0.5 to about 10 mm.

4. An unsown pregerminated rice seed according to claim 3, wherein the radicle size is from about 1 to about 5 mm.

5. An unsown pregerminated rice seed according to claim 1, also coated with an insecticidal 1-arylpyrazole compound of the formula:

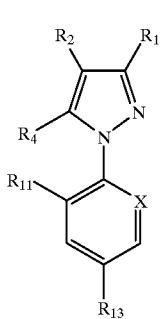

(I)

in which:

$R_1$ is CN or methyl;

$R_2$ is $S(O)_n R_3$;

$R_3$ is alkyl or haloalkyl;

$R_4$ represents a hydrogen or halogen atom or a member selected from the group consisting of $NR_5 R_6$, $S(O)_m R_7$, $C(O)R_7$, $C(O)O-R_7$, alkyl, haloalkyl, $OR_8$ and $-N=C(R_9)(R_{10})$;

$R_5$ and $R_6$ independently represent a hydrogen atom or an alkyl, haloalkyl, C(O)alkyl, alkoxycarbonyl or $S(O)_r$ $CF_3$ radical; or $R_5$ and $R_6$ together form a divalent alkylene radical which is optionally interrupted by one or two heteroatoms;

$R_7$ represents an alkyl or haloalkyl radical;

$R_8$ represents an alkyl or haloalkyl radical or a hydrogen atom;

$R_9$ represents an alkyl radical or a hydrogen atom;

$R_{10}$ represents a phenyl or heteroaryl group which is unsubstituted or substituted by one or more halogen, OH, —O-alkyl, —S-alkyl, cyano or alkyl;

X represents a trivalent nitrogen atom or a C—$R_{12}$ radical, the other three valences of the carbon atom forming part of the aromatic ring;

$R_{11}$ and $R_{12}$ represent, independently of each other, a hydrogen or halogen atom;

$R_{13}$ represents a halogen atom or a haloalkyl, haloalkoxy, $S(O)_q CF_3$ or $SF_5$ group; and m, n, q, and r represent, independently of one another, an integer equal to 0, 1, or 2;

provided that, when $R_1$ is methyl, then $R_3$ is haloalkyl, $R_4$ is $NH_2$, $R_{11}$ is Cl, $R_{13}$ is $CF_3$ and X is N.

6. An unsown pregerminated rice seed according to claim 5, wherein the weight/weight ratio of compound of formula (I) to gibberellic acid is from about 10/1 to about 1000/1.

7. An unsown pregerminated rice seed according to claim 6, wherein the weight/weight ratio of compound of formula (I) to gibberellic acid is from about 20/1 to about 200/1.

8. An unsown pregerminated rice seed according to claim 5, wherein, in the compound of formula (I), $R_1$ is CN; $R_3$ is a haloalkyl radical; $R_4$ is $NH_2$; X is C—$R_{12}$; $R_{11}$ and $R_{12}$ represent, independently of each other, a halogen atom; and $R_{13}$ is a haloalkyl radical.

9. An unsown pregerminated rice seed according to claim 8, wherein the weight/weight ratio of compound of formula (I) to gibberellic acid is from about 10/1 to about 1000/1.

10. An unsown pregerminated rice seed according to claim 9, wherein the weight/weight ratio of compound of formula (I) to gibberellic acid is from about 20/1 to about 200/1.

11. An unsown pregerminated rice seed according to claim 8, wherein the compound of formula (I) is 5-amino-1-(2,6-dichloro-4-trifluoromethylphenyl)-4-trifluoromethylsulfinyl-3-cyanopyrazole.

12. An unsown pregerminated rice seed according to claim 11, wherein the weight/weight ratio of 5-amino-i-(2,6-dichloro-4-trifluoromethylphenyl)-4-trifluoromethylsulfinyl-3-cyanopyrazole to gibberellic acid is from about 10/1 to about 1000/1.

13. An unsown pregerminated rice seed according to claim 12, wherein the weight/weight ratio of 5-amino-i-(2,6-dichloro-4-trifluoromethylphenyl)-4-trifluoromethylsulfinyl-3-cyanopyrazole to gibberellic acid is from about 20/1 to about 200/1.

14. An unsown pregerminated dry rice seed according to claim 1.

15. An unsown pregerminated dry rice seed according to claim 5.

* * * * *